US008654698B2

(12) United States Patent
Koskela et al.

(10) Patent No.: US 8,654,698 B2
(45) Date of Patent: Feb. 18, 2014

(54) WIRELESS NETWORK OPERATION ON LICENSE-EXEMPT BAND

(75) Inventors: Timo K. Koskela, Oulu (FI);
Sami-Jukka Hakola, Kempele (FI);
Anna Pantelidou, Oulu (FI); Samuli Turtinen, Li (FI)

(73) Assignee: Broadcom Corporation, Irvine, CA (US)

( * ) Notice: Subject to any disclaimer, the term of this patent is extended or adjusted under 35 U.S.C. 154(b) by 273 days.

(21) Appl. No.: 13/184,702

(22) Filed: Jul. 18, 2011

(65) Prior Publication Data

US 2013/0023202 A1    Jan. 24, 2013

(51) Int. Cl.
| | |
|---|---|
| *H04H 20/71* | (2008.01) |
| *H04W 4/00* | (2009.01) |
| *H04J 3/26* | (2006.01) |
| *H04J 3/16* | (2006.01) |
| *H04W 72/00* | (2009.01) |
| *H04B 7/00* | (2006.01) |

(52) U.S. Cl.
USPC ........... 370/312; 370/329; 370/432; 370/437; 455/450; 455/500

(58) Field of Classification Search
USPC .............. 370/312, 329, 338, 331, 395.3, 432, 370/437; 455/414.1, 500, 442–444, 450
See application file for complete search history.

(56) References Cited

U.S. PATENT DOCUMENTS

| | | | | |
|---|---|---|---|---|
| 2011/0116458 | A1* | 5/2011 | Hsu et al. | 370/329 |
| 2011/0158147 | A1* | 6/2011 | Li et al. | 370/312 |
| 2011/0222488 | A1* | 9/2011 | Kim et al. | 370/329 |
| 2011/0310867 | A1* | 12/2011 | Kennedy et al. | 370/338 |
| 2013/0016670 | A1* | 1/2013 | Shellhammer et al. | 370/329 |

FOREIGN PATENT DOCUMENTS

WO   WO2011/111918 A   9/2011

OTHER PUBLICATIONS

"IEEE Standard for Information Technology—Telecommunications and information exchange between systems—Local and metropolitan areas networks—Specific requirements Part 11: Wireless LAND Medium Access Control (MAC) and Physical Layer (PHY) Specifications", IEEE Draft P802.11-REVmb™/D9.1, Jul. 2011, 37 pgs.
Wang, Jiang; "Emerging cognitive radio applications: A survey," IEEE Communications Magazine, Mar. 1, 2011, IEEE Service Center, Piscataway, US; vol. 49; p. 74-81.
"In the Matter of Unlicensed Operation in the TV Broadcast Bands et al.", Seocnd Memorandum Opinion and Order, Federal Communications Commission, Sep. 23, 2010, 101 pgs.
"Part 11: Wireless LAN Medium Access Control (MAC) and Physical Layer (PHY) specifications, Amendment 3: TV White Spaces Operation", IEEE P802.11af™/D1.02, Jun. 2011, 157 pgs.

* cited by examiner

*Primary Examiner* — Un C Cho
*Assistant Examiner* — Jeremy Costin
(74) *Attorney, Agent, or Firm* — Stanton IP Law

(57) ABSTRACT

An apparatus receives from a first device a first broadcast message/beacon which comprises an identifier for an enabling station, then uses the identifier to associate with the enabling station to obtain from it a list of at least one license-exempt channel (e.g., TV whitespaces). In one embodiment the apparatus can then join an ad hoc network (IBSS) with the first device and transmit a second beacon which comprises the identifier for the enabling station. If the apparatus hears multiple beacons advertising different IBSSs, it can select to join the first device's ad hoc network over the other(s) based on a service offered or the first device's network being trusted. Various examples are detailed for where in the beacon frame the identifier (e.g., SSID) might be placed. In one example the apparatus and first device are Mode I devices and the enabling station is a Mode II device under (draft) IEEE802.11af.

14 Claims, 4 Drawing Sheets

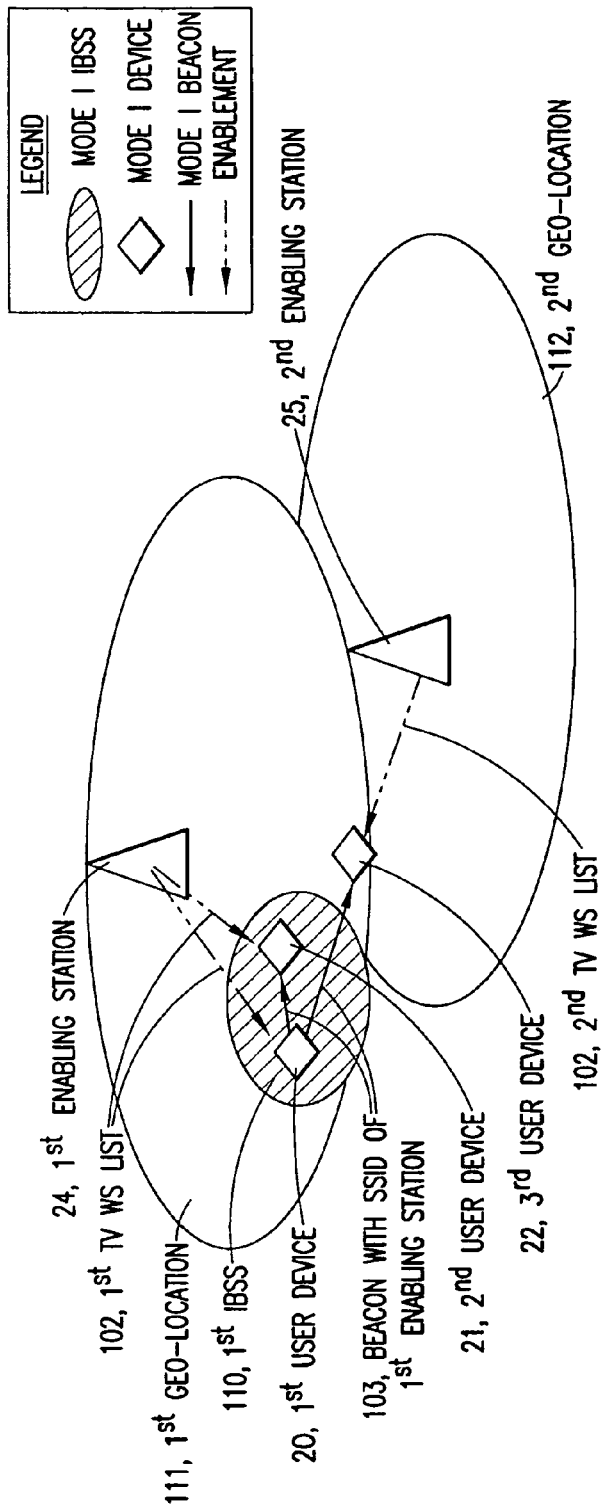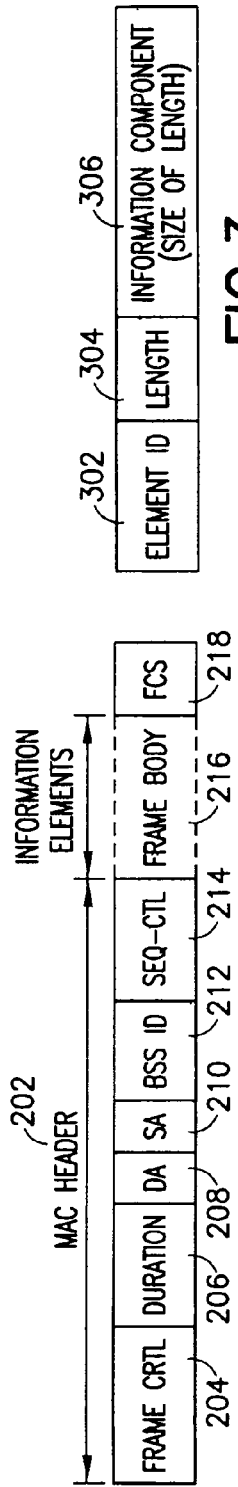

WIRELESS NETWORK OPERATION ON LICENSE-EXEMPT BAND

TECHNICAL FIELD

The exemplary and non-limiting embodiments of this invention relate generally to wireless communication systems, methods, devices and computer programs, and more specifically relate to enabling ad hoc network operation in unlicensed spectrum such as television white spaces.

BACKGROUND

The following abbreviations that may be found in the specification and/or the drawing figures are defined as follows:
BSSID basic service set ID
CTRL control
DA destination address
E-UTRAN evolved UMTS terrestrial radio access network
FCC Federal Communications Commission
FCS frame check sequence
IBSS independent basic service set
ID identifier
IEEE Institute for Electrical and Electronics Engineers
ISM industrial, scientific and medical
LTE-A long term evolution (of E-UTRAN)-advanced
MAC medium access control
PHY physical
RAT radio access technology
RX receive
SA sender address
SSID service set identifier
TVBD television band device
TVWS television white spaces
TX transmit
WLAN wireless local area network As radio spectrum for public use becomes increasingly burdened, research has turned recently to exploiting license-exempt radio spectrum such as the ISM band and what in the United States are known as TVWS. In general license-exempt radio spectrum is sometimes referred to as a shared band, contrasted with conventional cellular systems which utilize radio spectrum for which the system operator holds a license from a government regulator such as the FCC in the United States. There are various ways being considered to exploit this license-exempt spectrum, including direct device-to-device communications and offloading traffic from the cellular/licensed band onto the license-exempt band when the licensed band becomes too congested. Whether for traffic offload or otherwise, use of the license-exempt spectrum may in some cases be coordinated by the licensed spectrum radio systems, or in other cases they may be used by a stand-alone cell such as a LTE-A femto cell which provides fast access to the Internet in a similar manner to the WLAN specifications at IEEE 802.11.

TVWS is a particular portion of the license-exempt spectrum which was at one time set aside for television broadcast but which in recent years has become increasingly available for other uses. TVWS is suitable for radio communications due to their available large bandwidths at frequencies which are suitable for many different radio applications. But availability of the whole TVWS bandwidth is not complete, and so it is envisioned that there will be whitespace or TV band databases indicating for specific geographic areas or geo-locations which portions of that license-exempt spectrum are available to parties other than those involved with television broadcasting. Such portions may be identified in the relevant database as indexed channels, bandwidth and center frequency, upper and lower frequency bounds, or other frequency-definitive parameters. One of several reasons these envisioned databases need to be geographically specific is that television spectrum administration is not universal but is often country-specific. Another is that television broadcasts in one but not all regions of a country may need a portion of the spectrum for only a limited time.

Relevant to TVWS in the United States, the FCC defines two concepts for the help of find available channels; a TV bands database as summarized above and the geo-location capability. See for example document FCC 10-174; SECOND MEMORANDUM OPINION AND ORDER; UNLICENSED OPERATION IN THE TV BROADCAST BANDS—ADDITIONAL SPECTRUM FOR UNLICENSED DEVICES BELOW 900 MHz AND ABOVE 3 GHz BAND (adopted and released Sep. 23, 2010). The TV band database will maintain records of all authorized services in the TV frequency bands and so is capable of determining the available channels as a specific geographic location. Such available (or equivalently the used) channels are provided as lists to TVBSs that have been certified under the FCC's equipment authorization procedures. Some of the TVBDs will have a geo-location capability, and those devices should be able to determine their own geographic coordinates within a certain level of accuracy (+/−50 m). This capability is used with a TV bands database to determine the availability of TV channels at a TVBD's geo-location. The FCC defines several types of TVBDs as follows based on their characteristics.

A fixed TVBD is located at a specified fixed location and is able to: select a channel from the TV bands database; initiate and operate a network (by sending enabling signals to other fixed TVBDs or personal/portable TVBDs); and provide to a Mode I personal/portable device (see below) a list of available channels on which the Mode I device may operate (about TV channel 20) and a supplemental list of available channels for Mode I devices (these available channels are adjacent to occupied TV channels and are those on which a fixed TVBD cannot operate). Examples of what may operate as a fixed TVBD in the LTE system include an access node/eNodeB, a mobility management entity MME, a serving gateway S-GW, a local gateway L-GW, and a packet gateway P-GW. Similarly functioning nodes in other radio access networks may also serve the functions of a fixed TVBD. The maximum power a fixed TVBD is allowed to deliver to its TX antenna shall not exceed 1 W, and the maximum power spectral density (any 100 kHz during any time interval of continuous transmission) is 12.2 dBm.

A Mode I personal/portable device is another of the FCC's TVBD types. This type does not use any internal geo-location capability it may have (if any) to find its TVWS channels so even if it has access to a TV bands database the mode I device obtains a channel list from either a fixed TVBD or from a Mode II personal/portable TVBD (see below). A Mode I device may operate only as a client or dependent station/device, but not as an enabling station/device.

A Mode II personal/portable device is a portable device having similar functions as a fixed TVBD, but does not need to transmit/receive signals at a specified and fixed place. For personal/portable TVBDs, the maximum effective isotropic radiated power (EIRP) is 100 mW (20 dBm). If the personal/portable TVBD does not meet the adjacent channel separation requirements (the distance between the TVBD and the TV station is smaller than the minimum distance requirement), the maximum EIRP is set to 40 mW (16 dBm). The maximum power spectral densities for personal/portable devices operating adjacent to occupied TV channels is −1.6 dBm, otherwise 2.2 dBm.

And finally the FCC has designated a sensing only device, which is a personal/portable TVBD that uses spectrum sensing to determine a list of available channels. It can use the frequency bands 512-608 MHz (TV channels 21-36) and 614-698 MHz (TV channels 38-51). It is worthy to know that spectrum sensing is only defined for personal/portable TVBDs. The maximum power spectral density for sensing only devices is −0.8 dBm.

The IEEE 802.11af standard being drafted is intended to fulfill the above requirements in its TVWS operation. Relevant to this endeavor are the FCC's further requirements that Mode I devices are to be enabled by a Mode II device (called enabling station) as outlined in the document FCC 10-174 cited above. Once the mode I device is enabled it may start transmission on an available television channel or channels (more generally, a TVWS frequency resource).

Two or more Mode I TVBDs may form an IBSS network with one another, which is one type of an ad hoc network. An IBSS is a stand-alone basic service set that has no backbone infrastructure and which has two or more stations. Non-enabled Mode I TVBDs are not allowed to transmit before becoming enabled but they may listen to the transmissions of other devices. Mode I TVBDs become enabled by getting the relevant channel list from an enabling device, which may be a Mode II TVBD or a fixed TVBD. Once enabled, the Mode I TVBDs have to regularly receive an enabling signal from the Mode II or fixed TVBD which enabled its operation and provided the channel list. However, it is not clear yet exactly how the non-enabled Mode I device can become enabled as it may not know the Mode II/fixed TVBDs in the area and it cannot join the IBSS of another enabled Mode I TVBD before being enabled. Embodiments of these teachings are relevant to efficiently setting up and operating an IBSS. Though in the context of TVBDs and IBSSs, these teachings are not limited only to the IEEE 802.11af family of radio access technologies and are applicable for other types of ad hoc networking in the license-exempt band.

Relevant background may be seen at document IEEE P802.11af/D1.02: Wireless LAN Medium Access Control (MAC) and Physical layer (PHY) specifications; Amendment 3: TV White Spaces Operation (June 2011), as well as at the reference IEEE Draft P802.11-REVmb/D9.1: IEEE STANDARD FOR INFORMATION TECHNOLOGY—TELECOMMUNICATIONS AND INFORMATION EXCHANGE BETWEEN SYSTEMS—LOCAL AND METROPOLITAN AREA NETWORKS—SPECIFIC REQUIREMENTS PART 11: WIRELESS LAN MEDIUM ACCESS CONTROL (MAC) AND PHYSICAL LAYER (PHY) SPECIFICATIONS (July 2011).

SUMMARY

In a first exemplary embodiment of the invention there is an apparatus comprising at least one processor and at least one memory storing a computer program. In this embodiment the at least one memory with the computer program is configured with the at least one processor to cause the apparatus to at least: receive from a first device a first broadcast message which comprises an identifier for an enabling station; and use the identifier to associate with the enabling station and obtain from it a list of at least one license-exempt channel.

In a second exemplary embodiment of the invention there is a method comprising: receiving from a first device a first broadcast message which comprises an identifier for an enabling station; and using the identifier to associate with the enabling station and obtain from it a list of at least one license-exempt channel.

In a third exemplary embodiment of the invention there is a computer readable memory storing a computer program, in which the computer program comprises: code for reading an identifier for an enabling station from a first broadcast message received from a first device; and code for using the identifier to associate with the enabling station and to obtain from it a list of at least one license-exempt channel.

These and other embodiments and aspects are detailed below with particularity.

BRIEF DESCRIPTION OF THE DRAWINGS:

FIG. 1 is a schematic diagram illustrating an environment in which embodiments of the invention may be practiced to advantage.

FIG. 2 is a schematic diagram showing the frame structure of a conventional management frame in an IEEE 802.11af radio access system.

FIG. 3 is a schematic diagram showing the conventional structure of a generic variable length information element disposed in the frame body of the FIG. 2 management frame.

Figure 4:
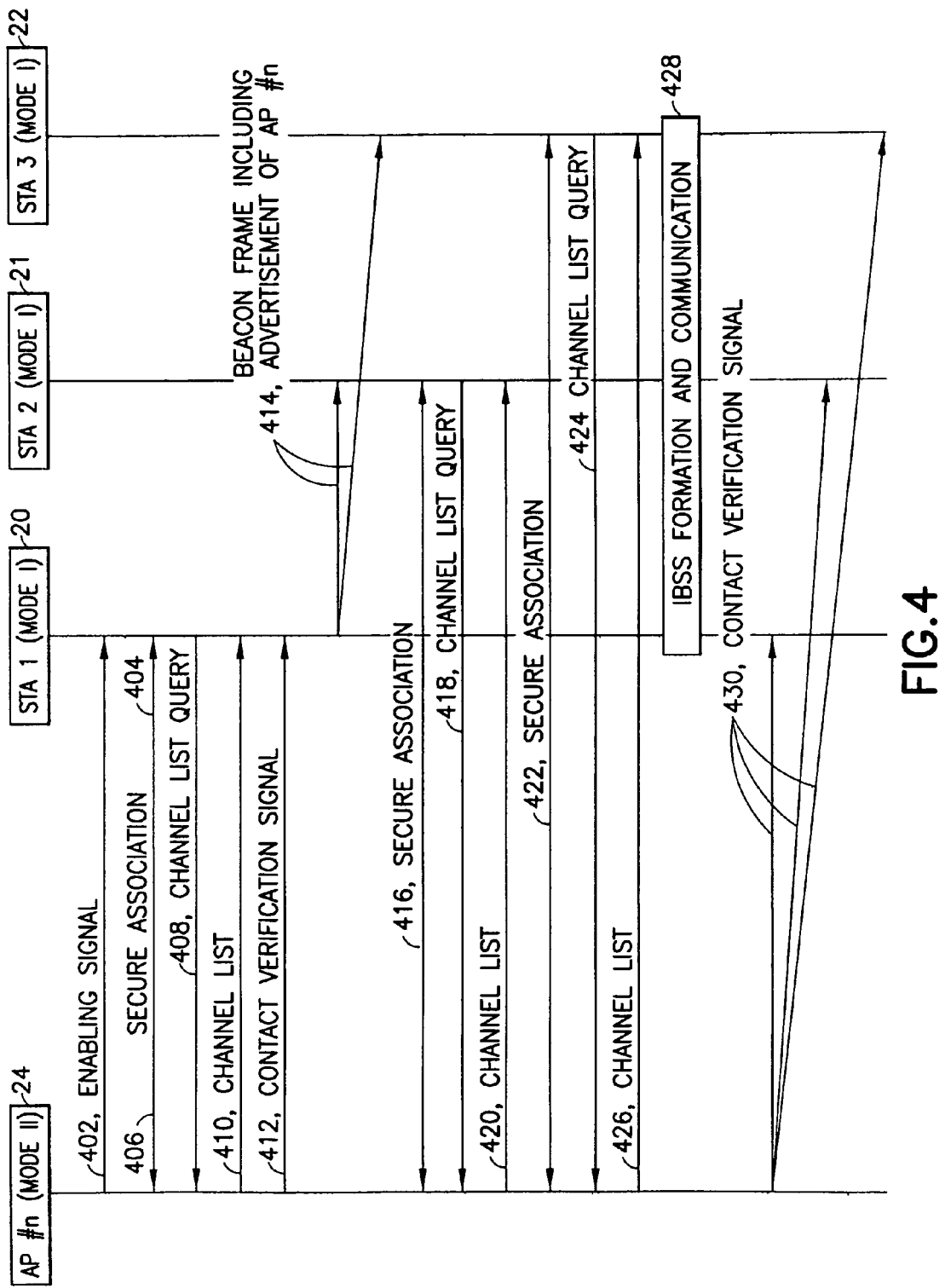
FIG. 4 is a signaling diagram illustrating communications among various nodes shown in FIG. 1 for associating and exchanging TVWS channel lists according to an exemplary embodiment of the invention.

DETAILED DESCRIPTION:

The terms enabling station and device are used in the description below to be RAT independent. Enabling station simply refers to the node which gives access to the list of license-exempt channels which are available; such a list enables the recipient to communicate on those listed channels. The (enabled or non-enabled) stations will be termed as user devices to avoid confusion with the enabling stations. For the specific but non-limiting case that the RAT is IEE 802.11af either of the enabling stations may be embodied as a fixed TVBD or a Mode II TVBD, the user devices may be stations embodied as Mode I TVBDs, and the license-exempt channel list is gleaned from the TVWS database. In some embodiments the Mode I and Mode II TVBDs may be embodied as user devices such as for example mobile telephony devices, cellular-capable radio handsets, and the like more generally referred to as UEs.

An environment in which embodiments of the invention may be practiced with advantage is shown at FIG. 1. Shown are two different enabling stations 24 and 25, and three different user devices 20, 21 and 22. In FIG. 1 a first user device 20 (Mode I TVBD) has formed a first IBSS network 101 with the second user device 21 (Mode I TVBD). Both the first 20 and the second 21 user devices are enabled by the first enabling station 24 (Mode II or fixed TVBD). The third user device 22 (Mode I TVBD) is enabled by the second enabling station 25 (Mode II or fixed TVBD) and that third user device 22 is shown as receiving the beacon 103 broadcast by the first user device 20 despite not being in the first IBSS 101 with it.

As noted above for IEEE 802.11af, non-enabled user devices are not allowed transmit to other mode I devices prior to the enablement but they are able to listen to transmissions. The mode I user devices may not be constantly connected to an enabling station (24 or 245), such as when they have no communication needs but want to check for mode I beacons to check whether there is a trusted (user) device which wishes to connect with it.

Assume that the second user device 21 is not yet enabled. It detects the beacon 103 transmitted by the first user device 20 which it sees is a known device and decides the join the IBSS 101 of the beaconing user device 20. To be able to connect with the beaconing user device 20 and transmit anything to it, the second user device 21 needs to be enabled by some enablement station which in FIG. 1 are the designated as reference numbers 24, 25.

The second user device 21 in the FIG. 1 example will be enabled by the first enabling station 24 as detailed by the various exemplary but non-limiting embodiments below. Being enabled means the second user device 21 has obtained from the first enabling station 24 the list of available license-exempt channels, and only then will it be able to transmit on those available channels to the first user device 20.

Firstly, the first user device 20 transmits its beacon 103 to other user devices 21, 22 in the area to form an IBSS or to indicate the existence of an IBSS 101. The first user device 20 includes in the broadcast message 103 the identifier for the first enabling station 24 to which it is associated. In an embodiment this broadcast message 103 is a beacon. In an embodiment this station identifier can be the SSID or an equivalent in other RATs which identifies the first enabling station 24.

The non-enabled second user device 21 devices receive the beacon frame transmission from the enabled first user device 20. The second user device 21 then checks from the beacon frame which station enabled the first user device 20 and starts listening for the first enabling station's enablement signaling. Upon detecting the first enabling station 24 the second user device 21 then associates with it and obtains the channel list for the license-exempt band for the first geo-location area 111 in which the first enabling station 24 and the first and second user devices 20, 21 are operating. Now the second user device 21 is enabled and is able to join the first IBSS 110 and starts sending its own beacons to advertise the identifier of the first enabling station 24 which is now also enabling the second user device 21.

Assume that the third user device 22 is established in its own second IBSS (not shown). Being enabled through the second enabling station 25, the third user device 22 can listen to the beacons 103 from user devices 20, 21 belonging to different (or the same) IBSS and obtain the identifiers for enabling stations 24, 25 operating even in different geo-location areas 111, 112. These identifiers can be used to drive the user devices in the same IBSS to connect to the same enabling station. So for example if the third user device 22 were moving toward the first IBSS 110 it will know in advance the identifier for the first enabling station 24 from the beacon 103 so it may associate with and obtain from the first enabling device 24 the channel list for the first geo-location area 111. Or the third user device 22 can remain enabled by the second enabling station 25 and still be part of the first IBSS 110 with user devices 20, 21 which are enabled by the different first enabling station 24.

In the case above in which the third user device 22 is in a different IBSS from user devices 20 and 21, then the different user devices 20, 21, 22 would each be hearing beacons from multiple IBSSs. In this case each can select which IBSS to join based on services offered in the different IBSSs, and/or they may connect to only trusted IBSSs. For a case in which embodiments of the invention are implemented in an IEEE 802.11 system, any specific IBSS can exclude user devices from joining it using conventional or yet to be developed 802.11 authentication features.

Above it was noted that the third user device 22 may be enabled by the second enabling station while moving toward or even when joined to the first IBSS 110. In this case the third user device 22 does not have to dis-associate from the second enabling device 24 but can be enabled simultaneously from the first 24 and the second 25 enabling stations. In this case the third user device 22 can include in the beacon it transmits the identifiers of both those enabling stations 24, 25. Or in an embodiment the user device 22 enabled by multiple enabling stations simultaneously will include only one of their identifiers in its beacon.

By the above examples if the user devices 20, 21, 22 are all Mode I devices then the communications between them can remain aligned with the FCC regulations (or other regulatory body) so long as they receive their enablement from a valid Mode II device 24, 25.

FIGS. 2-3 provide details as to exactly where in the beacon the user devices 20, 21, 22 will place the identifier of their respective enabling device(s) 24, 25. These examples refer to conventional frames in the IEEE 802.11 RAT but are easily adapted to the frame structure of other RATs.

The 802.11 specifications provide for three basic frame types: control frames, data frames, and management frames. Management frames have fixed headers and information is carried in the frame body in discrete information elements. FIG. 2 illustrates the structure of a conventional 802.11 management frame, divided broadly into the frame header 202 and the frame body 216 which carries the information elements.

The header is divided into discrete fields. There is a frame control field 204 which indicates for example the protocol version and frame type (and possibly also frame subtype). There is a duration field 206 which indicates a duration value of the frame, how long it is. There is a DA field 208 which carries the destination MAC address and a SA field 210 which carries the sender MAC address. The header 202 also defines a BSS ID field 212 which carries the BSS ID for the sender and a sequence control field 214 which contains values for the recipient to check for duplicate frames.

The frame body 216 carries the information elements and certain other fixed fields. Following the frame body is a frame check sequence field 218 that carries a cyclic redundancy checksum of the whole frame.

The frame body 216 consists of fixed length fields and variable length information element fields. FIG. 3 illustrates a generic format for one information element field; there is an identifier field 302 to identify the particular information element, a length field 304 to indicate how long is the information element, and an information component 306 which carries the relevant information for that information element and whose size is governed by the length field 304.

In an IBSS network, all the joined user devices 20, 21 participate in the beaconing. Upon joining the IBSS a user device adopts the beaconing period for the beacon transmissions. The beacon frame is a subtype of a management frame shown at FIG. 2. As noted above the enabling station information is transmitted in the beacon frame. As detailed above the enabling station information in the beacon frame includes its SSID or other identifier, but in certain embodiments additional information about the enabling station can also be included. Now understanding from FIG. 2 the structure of the management frame, there are several options where to place this enabling station information:

the enabling station information may be indicated in the frame body 216, in a new information element field;

the enabling station information may be indicated in the Information Element 6 (IBSS Parameter Set) which is a pre-existing information element that lies in the frame body 216 also;

the enabling station information may be indicated in the BSS ID field 212 (which also effectively identifies the IBSS);

a new field in the MAC header 202 may be specified for including the enabling station information; and the enabling station information (such as the enabling station ID) may be indicated in the Management Frame subtype: 'Action Frame' by defining new 'Category', 'Action' and 'Information' fields Additionally if the (third) user device 22 belonging to the IBSS 110 is enabled by several enabling stations, any of the above implementations may be employed such that the beaconing device 22 indicates the identifiers for each of its enabling stations 24, 25 in its beacon frame.

FIG. 4 is a signaling diagram showing communications among various of the communication nodes shown at FIG. 1 according to an exemplary but non-limiting embodiment of the invention. FIG. 4 begins with the first user device 20 becoming associated with the first enabling station 24 via an enabling signal 402 from the first enabling station 24 followed by bi-directional secure association signaling 404 with it. Once this association is established the first user device 20 sends to the enabling station 24 a query 406 for its license-exempt channel list which it receives at message 410. There may be a contact verification signaling message 412 to maintain the channel list 410 in its most recent iteration. Now being associated with its enabling station 24, the first user device 20 transmits its beacon frame 414 which bears the identifier of that enabling station 24.

The second 21 and third 22 user devices are not yet enabled, but they are able to listen to the beacon 414 from the first user device 20. Using the identifier within that beacon 414 they engage in association signaling 416, 422 with the identified first enabling device 24. The second 21 and third 22 user devices are now associated with the enabling device 24 and request via queries 418, 424 from it their geo-location specific channel list which the first enabling device 24 provides at messages 420 and 426. Now all the user devices 20, 21, 22 are enabled and can form at message exchange 428 an IBSS 110 through which they can communicate directly with one another on the license-exempt channels within their lists 410, 420, 426. Updating of the channel lists continues routinely via contact verification signaling shown in FIG. 4 as messages 430.

According to the above exemplary embodiments one technical effect of these teachings is to enable multiple Mode I devices 20, 21 (and possibly 22) in the same IBSS to connect to the same Mode II device 24.

Figure 5:
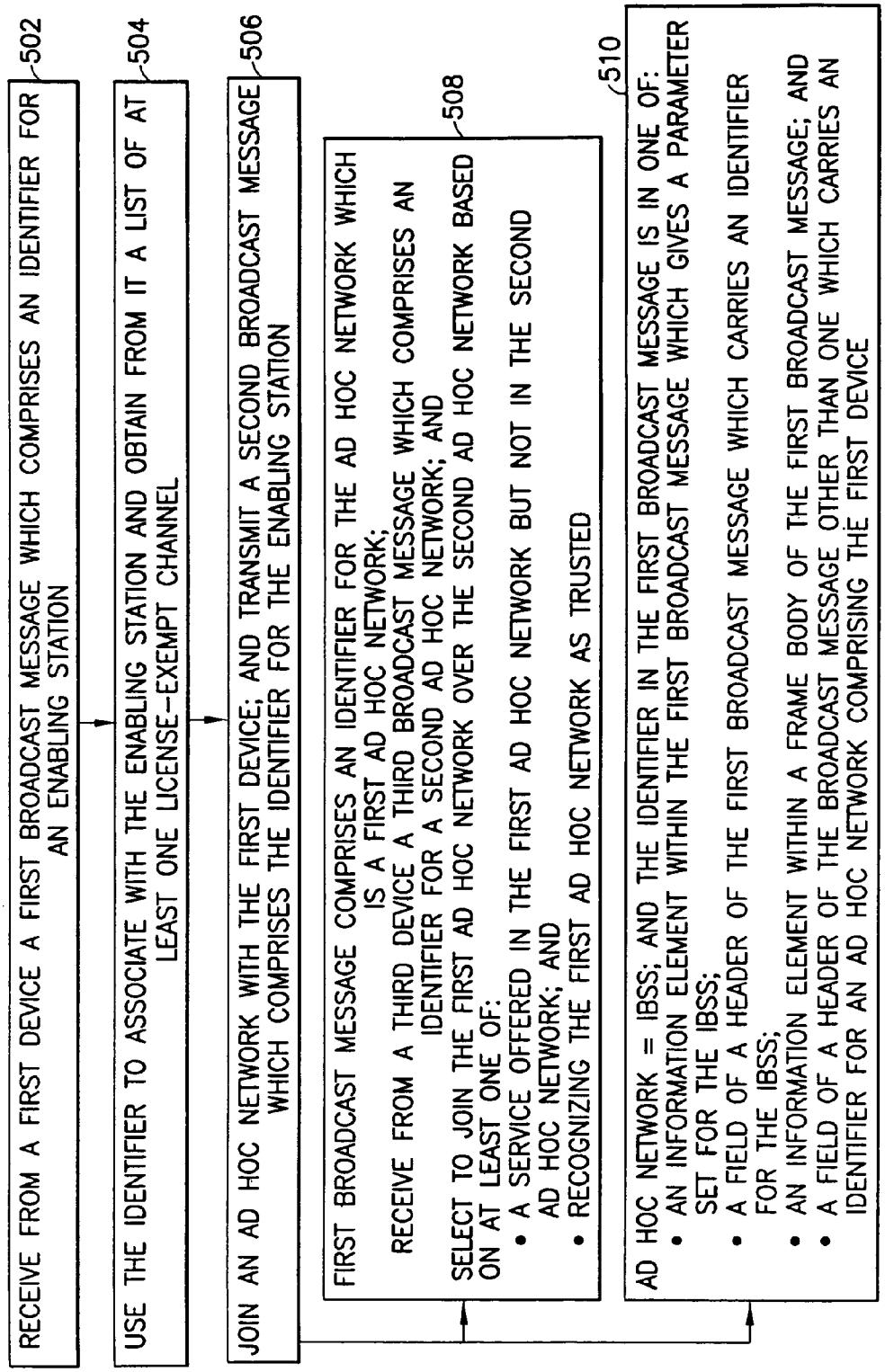
FIG. 5 is a logic flow diagram that illustrates the operation of a method, and a result of execution of computer program instructions embodied on a computer readable memory, in accordance with the exemplary embodiments of this invention.

FIG. 5 is a logic flow diagram which describes an exemplary embodiment of the invention from the perspective of the second user device 21 which begins from an un-enabled state. FIG. 5 represents results from executing a computer program or an implementing algorithm stored in the local memory of the second user device 21, as well as illustrating the operation of a method and a specific manner in which the second user device 21 (or one or more components thereof) are configured to cause that overall host electronic device to operate. The various blocks shown in FIG. 5 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Blocks 502 and 504 concern the second user device 21 receiving the beacon from the first user device 20 and using the identifier within it to obtain the license-exempt channel list. At block 502 the second user device 21 (or apparatus) receives from a first device 20 a first broadcast message 103, 414 which comprises an identifier for an enabling station 24. At block 504 the second user device 21 (apparatus) then uses the identifier to associate with the enabling station and obtain from that enabling station 24 a list of at least one license-exempt channel. For example, the second user device 21 can use that identifier to associate as follows. Upon receiving the enabling station identifier in the IBSS broadcast message the receiving mode I station 21 has the knowledge to scan for the same enabling station 24. Such a scanning procedure includes the listening of beacon transmissions of different Access Points 24, 25 and their Service Set Identifiers. Once the receiving mode I station 21 hears the said enabling mode II station's 24 beacon (or other such enabling signal it might transmit) the receiving mode I station 21 is allowed/able to transmit an association request to the desired enabling station 24. After the association procedure the mode I station 21 is able to obtain the channel list from the enabling mode II station 24 and then it is allowed to transmit on the TVWS of that channel list, thus communicating with the desired IBSS 110.

Further portions of FIG. 5 go to specific implementations and embodiments detailed above which are optional to the broader teachings of blocks 502 and 504. Block 506 describes the second user device 21 being established in the IBSS of the first user device 20. Specifically, the second user device 21 joins an ad hoc network with the first device 20 and transmits a second broadcast message which comprises the identifier for the enabling station 24. Block 508 details if the second user device is hearing multiple beacons identifying multiple IBSSs. In that case the beacon from the first user device carries an identifier for its ad hoc network which is a first ad hoc network, and the second user device 21 also receives from a third device 22 a third broadcast message which comprises an identifier for a second ad hoc network. Assuming it is the first ad hoc network that the second user device joins as in block 506, then block 508 details that the reason the second user device 21 selected to join that first ad hoc network over the second ad hoc network was based on either or both of a) a service that is offered in the first ad hoc network but not in the second ad hoc network; and b) the second user device 21 recognizing the first ad hoc network as a trusted network.

Block 510 summarizes the various specific locations detailed above at which the enabling station 24 identifier might be placed in the beacon frame sent by the first user device at block 502. Assuming as in the above examples that the ad hoc network of block 506 is an IBSS, then block 510 specifically provides four distinct implementations:

a) an information element within the first broadcast message which gives a parameter set for the IBSS (this would be in the frame body 216);
b) a field of a header 202 of the first broadcast message which carries an identifier for the IBSS 212;
c) an information element within a frame body 216 of the first broadcast message; and
d) a field 212 of a header of the broadcast message other than one which carries an identifier for an ad hoc network comprising the first device.

Also detailed above but not within FIG. 5 is the case in which the second user device receives different identifiers for two (or more) enabling stations in the same broadcast message of block 502. This means the first user device 20 is enabled by two enabling stations 24, 25 simultaneously. To keep them distinct consider the enabling station introduced at block 502 as a first enabling station and so the first broadcast message then carries the identifier for the first enabling station 24 and an identifier for a second enabling station 25. Each of those enabling stations 24, 25 provide to their respective enabled devices a list of at least one license-exempt channel.

Also as detailed with respect to the signaling diagram of FIG. 4, the association at block 504 of FIG. 5 is a secure association between the second user device 21 and the enabling station 24. As in the above examples, the first 20 and the second 21 user devices are each Mode I devices lacking an internal geo-location capability (or if they have such capability are not utilizing it to obtain their respective location-specific lists of TVWS channels), and the enabling station 24 is a Mode II device which provides access to a television white space database with geo-location specific available channels in at least one license-exempt frequency band.

Figure 6:
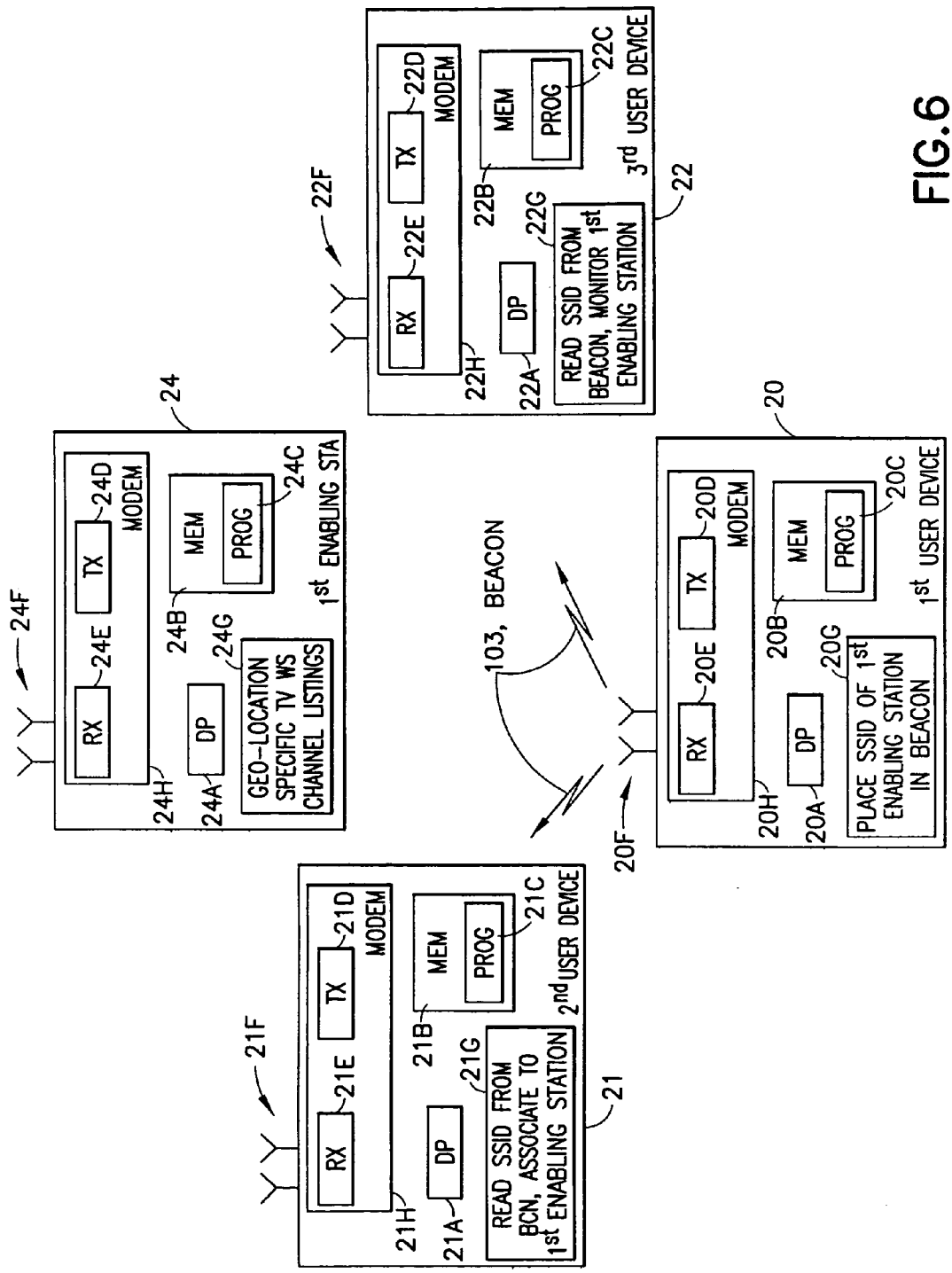
FIG. 6 is a simplified block diagram of various devices shown at FIG. 1, which are exemplary electronic devices suitable for use in practicing the exemplary embodiments of the invention.

Reference is now made to FIG. 6 for illustrating a simplified block diagram of various electronic devices and apparatus that are suitable for use in practicing the exemplary embodiments of this invention. In FIG. 6 a first enabling device 24 is adapted for communication over a wireless link (not specifically shown) with mobile apparatuses, such as mobile terminals, UEs or user devices 20, 21, 22. The first enabling device 24 may be embodied as a macro eNodeB (a base station of an E-UTRAN system), a WLAN access point, a femto eNodeB, or other type of base stations or access points adapted to provide the license-exempt channel lists as detailed above.

In one particular implementation, any of the user devices 20, 21, 22 may be embodied as a WLAN station STA, either an access point station or a non-access point station. In the case of an access point station, it would function for TVWS purposes as a dependent station enabled by a Mode II device/enabling station 24 and for WLAN purposes as a WLAN access point for any non-access point STAs associated with it under WLAN procedures. In such an embodiment the enabled access point station would not be able to enable any of those associated non-access point STAs for TVWS purposes since it would not be operating as a Mode II device; for TVWS purposes it is operating only as a Mode I device that is enabled by a different Mode II device 24. But in this case the enabled access point station can advertise to its associated STAs and any other devices that are in radio range the identifier of its enabling station 24, as detailed above for the beacons sent by the first 20 and second 21 user devices.

The first user device 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with the first enabling station 24 via one or more antennas 20F. The RX 20E and the TX 20D are each shown as being embodied with a modem 20H in a radio-frequency front end chip, which is one non-limiting embodiment; the modem 20H may be a physically separate but electrically coupled component. The first user device 20 also has stored in the MEM 20B at block 20G computer program code for placing the SSID or other identifier in the appropriate location of the beacon frame for transmission. Above are given some non-limiting appropriate locations.

The second user device 21 similarly includes processing means such as at least one data processor (DP) 21A, storing means such as at least one computer-readable memory (MEM) 21B storing at least one computer program (PROG) 21C, and communicating means such as a transmitter TX 21D and a receiver RX 21E and a modem 21H for bidirectional wireless communications with the first user device 20 as well as the other apparatus of FIG. 6 via one or more antennas 21F. The second user device stores in its local MEM 21B at block 21G computer program code for reading the SSID or other identifier of the first enabling station 24 from the beacon 103 it receives, and to utilize that SSID/identifier in forming an association with the first enabling station 24 to obtain the channel list.

Similarly, the third user device 22 includes processing means such as at least one data processor (DP) 22A, storing means such as at least one computer-readable memory (MEM) 22B storing at least one computer program (PROG) 22C, and communicating means such as a modem 22H for bidirectional communication with the other devices of FIG. 6. The third user device 22 also has stored in its local MEM 22B at block 22G the computer program code for reading the SSID or other identifier of the first enabling station 24 from the beacon 103 it receives, and simply to illustrate another aspect different from the second user device 21 we assume the third user device 22 is already enabled by the second enabling device 25 as in FIG. 1 and so the computer instructions at block 22G control the third user device 22 to simply monitor the first enabling station until it needs or prefers to associate to it.

The first enabling device 24 includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E and a modem 24H for bidirectional wireless communications with user devices 20, 21, 22 detailed above via its antennas 24F. The first enabling station 24 stores at block 24G in its local MEM 24B those geo-location specific TVWS channel lists which it provides to those user devices 20, 21 associated to it.

At least one of the PROGs 20C, 21C, 22C in the respective user device 20, 21, 22 is assumed to include program instructions that, when executed by the associated DP 20A, 21A, 22A, enable the device to operate in accordance with the exemplary embodiments of this invention, as detailed above. Blocks 20G, 21G and 22G summarize different results from executing different tangibly stored software to implement certain aspects of these teachings. In these regards the exemplary embodiments of this invention may be implemented at least in part by computer software stored on the MEM 20B, 21B, 22B which is executable by the DP 21A of the second user device 21 and/or by the DP 20A/22A of the respective other user devices 20, 22, or by hardware, or by a combination of tangibly stored software and hardware (and tangibly stored firmware). Electronic devices implementing these aspects of the invention need not be the entire devices as depicted at FIG.

6, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 21B, 22B and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 21A, 22A and 24A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
   at least one processor; and
   at least one memory storing a computer program;
   in which the at least one memory with the computer program is configured with the at least one processor to cause the apparatus to at least:
   receive from a first device a first broadcast message which comprises a network identifier for an enabling station;
   use the network identifier to associate with the enabling station and obtain from it a list of at least one license-exempt channel, in which the at least one license-exempt channel comprises at least a portion of television white spaces (TVWS) spectrum;
   join a first ad hoc network with the first device, in which the first broadcast message comprises a first identifier for the first ad hoc network;
   transmit a second broadcast message which comprises the network identifier for the enabling station;
   receive from a third device a third broadcast message which comprises a second identifier for a second ad hoc network; and
   to select joining the first ad hoc network over the second ad hoc network based on at least one of:
   a service offered in the first ad hoc network but not in the second ad hoc network; and
   recognizing the first ad hoc network as trusted.

2. The apparatus according to claim 1, in which the first ad hoc network comprises an independent basic service set (IBSS) and the network identifier in the first broadcast message is in one of:
   an information element within the first broadcast message which gives a parameter set for the IBSS; and
   a field of a header of the first broadcast message which carries an identifier for the IBSS.

3. The apparatus according to claim 1, in which the network identifier in the first broadcast message is in one of:
   an information element within a frame body of the first broadcast message; and
   a field of a header of the first broadcast message other than one which carries the first identifier for the first ad hoc network comprising the first device.

4. The apparatus according to claim 1, in which the enabling station is a first enabling station and the first broadcast message comprises the network identifier for the first enabling station and an identifier for a second enabling station, in which the first and the second enabling stations each provide to enabled devices a list of at least one license-exempt channel.

5. The apparatus according to claim 1, in which the apparatus uses the network identifier to form a secure association with the enabling station.

6. The apparatus according to claim 5, in which the first device and the apparatus are each Mode I devices which do not utilize any internal geo-location capability to obtain their respective lists of at least one license-exempt channel, and the enabling station is a Mode II device which provides access to a television white space database with geo-location specific available channels in at least one license-exempt frequency band.

7. A method, comprising:
   receiving from a first device a first broadcast message which comprises a network identifier for an enabling station; and
   using the network identifier to associate with the enabling station and obtain from it a list of at least one license-exempt channel, in which the at least one license-exempt channel comprises at least a portion of television white spaces (TVWS) spectrum;
   joining a first ad hoc network with the first device, in which the first broadcast message comprises a first identifier for the first ad hoc network;
   transmitting a second broadcast message which comprises the network identifier for the enabling station;
   receiving from a third device a third broadcast message which comprises a second identifier for a second ad hoc network; and
   selecting to join the first ad hoc network over the second ad hoc network based on at least one of:
   a service offered in the first ad hoc network but not in the second ad hoc network; and
   recognizing the first ad hoc network as trusted.

8. The method according to claim 7, in which the first ad hoc network comprises an independent basic service set (IBSS) and the network identifier in the first broadcast message is in one of:
   an information element within the first broadcast message which gives a parameter set for the IBSS; and
   a field of a header of the first broadcast message which carries an identifier for the IBSS.

9. The method according to claim 7, in which the network identifier in the first broadcast message is in one of:
   an information element within a frame body of the first broadcast message; and
   a field of a header of the first broadcast message other than one which carries the first identifier for the first ad hoc network comprising the first device.

10. The method according to claim 7, in which the enabling station is a first enabling station and the first broadcast message comprises the network identifier for the first enabling station and an identifier for a second enabling station, in which the first and the second enabling stations each provide to enabled devices a list of at least one license-exempt channel.

11. The method according to claim 7, in which using the network identifier to associate with the enabling station comprises forming a secure association with the enabling station.

12. The method according to claim 11, in which the first device and an apparatus executing the method are each Mode I devices which do not utilize any internal geo-location capability to obtain their respective lists of at least one license-exempt channel, and the enabling station is a Mode II device which provides access to a television white space database with geo-location specific available channels in at least one license-exempt frequency band.

13. A computer readable memory storing a computer program which when implemented by at least one processor causes the at least one processor to execute instructions, comprising:

code for reading a network identifier for an enabling station from a first broadcast message received from a first device;

code for using the network identifier to associate with the enabling station and to obtain from it a list of at least one license-exempt channel, in which the at least one license-exempt channel comprises at least a portion of television white spaces (TVWS) spectrum;

code for joining a first ad hoc network with the first device, in which the first broadcast message comprises a first identifier for the first ad hoc network;

code for inserting the network identifier for the enabling station in a second broadcast message for transmission;

code for reading a second identifier for a second ad hoc network from a third broadcast message received from a third device; and code for selecting to join the first ad hoc network over the second ad hoc network based on at least one of:

a service offered in the first ad hoc network but not in the second ad hoc network; and recognizing the first ad hoc network as trusted.

14. The computer readable memory according to claim 13, in which the first ad hoc network comprises an independent basic service set (IBSS) and the network identifier in the first broadcast message is in one of:

an information element within the first broadcast message which gives a parameter set for the IBSS;

a field of a header of the first broadcast message which carries an identifier for the IBSS; an information element within a frame body of the first broadcast message; and a field of a header of the first broadcast message other than one which carries the first identifier for the first ad hoc network.

\* \* \* \* \*